Aug. 12, 1941.  J. H. McCAULEY  2,252,638
ANIMATED ELECTRICAL DISCHARGE DEVICE
Filed Oct. 10, 1938
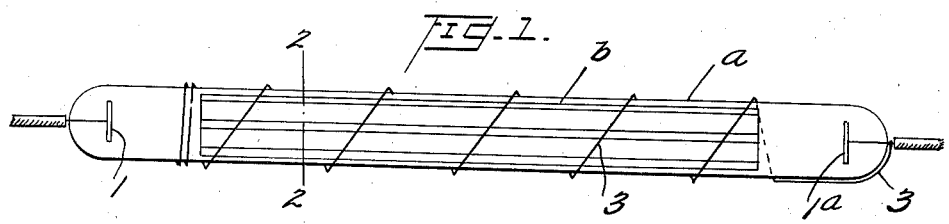
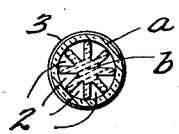
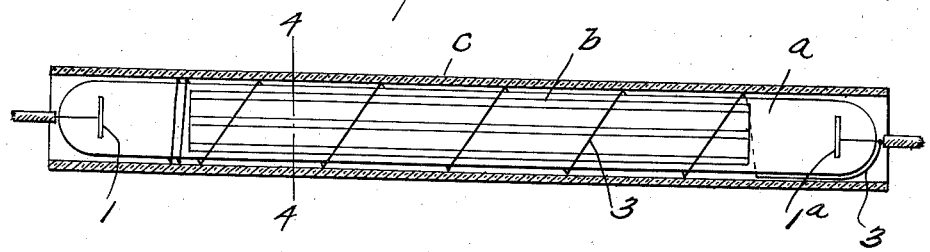
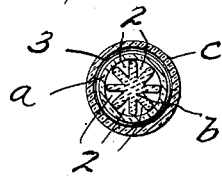
Inventor
John H. McCauley
By
Robert Watson
Attorney Patented Aug. 12, 1941

2,252,638

UNITED STATES PATENT OFFICE 2,252,638

ANIMATED ELECTRICAL DISCHARGE DEVICE

John H. McCauley, Hillside, N. J., assignor to Joseph F. Frese, Baltimore, Md., as trustee Application October 10, 1938, Serial No. 234,228

3 Claims. (Cl. 176—122)

This invention relates to animated electric discharge tubes. In my copending applications Serial Number 60,496 and Serial Number 118,647, I have shown such tubes, each containing a rare gas, such as neon, argon, or helium or mixtures of gases, and having spaced electrodes, and between the electrodes is a filler of insulating material which affords a plurality of passageways for the electrical discharge, and, external to the tube, is an electrical conductor which influences the course of the discharge, causing it to shift rapidly from one course or channel to another. Such devices are used in luminous signs to attract attention. In the applications above referred to, the external conductor is not connected to the electrodes or any source of electric power. In the present invention, the external conductor which influences the course of the discharge is connected to one of the electrodes, and in order to protect persons touching the device from shock, the conductor is covered by insulating material which does not obscure the filler or the luminous flashes caused by the shifting of the course of the discharge.

In the accompanying drawing,

Fig. 1 is a side view of an electrical discharge tube containing a filler of insulating material having a plurality of passageways for the electrical discharge and an external circuit connected to one of the electrodes, for influencing the course of the discharge;

Fig. 2 is a section on the line 2—2 of Fig. 1;

Fig. 3 is a side view of a tube the same as in Fig. 1 but having additionally a glass tube surrounding the discharge tube and enclosing the external control circuit, and, Fig. 4 is a section on the line 4—4 of Fig. 3.

Referring to Figs. 1 and 2 of the drawing, $a$ indicates a closed glass tube containing a rare gas, such as neon, argon, or helium, or a mixture of rare gases and also containing electrodes $l$ and $l^a$ and a filler $b$ of insulating material arranged in the space between said electrodes, which filler, as shown, has a plurality of grooves 2 forming passageways through any one of which the electrical discharge may take place. When the discharge takes place through one of the passageways or channels it produces a band of light extending longitudinally of the tube. The purpose of the present invention is to create active shifting of the discharge from channel to channel, thereby to produce a flickering effect. In my copending applications Serial Number 60,496 and Serial Number 118,647, I have shown discharge tubes with fillers having a plurality of passageways for the discharge and means for causing active shifting of the course of the discharge consisting of conductive material associated with the tube in the vicinity of the filler, this conductive material being insulated from the electrodes. In the present invention, the conductive material for this purpose is shown as a wire $3$ coiled about that part of the tube which contains the filler and connected to one of the electrodes, in this instance the electrode $l^a$. The wire may be bare or have an insulating covering. As the electrodes are, in practice, connected to the high tension side of a transformer, it may be desirable, in order to protect persons touching the tube from shock, to enclose the wire within a transparent covering, especially if it is a bare wire, and for this purpose I have shown an outer glass tube $c$ surrounding the wire and the discharge tube. With this transparent covering, the filler and the streams of light within the tube, caused by the electrical discharge are visible throughout the length of the filler. When the current is applied, very active shifting of the discharge from channel to channel in the filler takes place, because of the presence of the conductor on the outer side of the discharge tube. The effect is the same as described in my previous applications hereinbefore referred to, wherein the external circuit is not connected to the electrodes, except that in the tube of the present invention the shifting lines of light appear to be more brilliant than those that would be produced in the same tube by the same transformer if the external circuit were not connected to the transformer circuit.

The exterior conductor may be in the form of a bare wire or wire screen and may be covered with any transparent insulating material, such as glass or mica, or an insulating coating which will not obscure the filler and the flashes of light produced by the discharge; or if the conductor is in the form of an insulated wire it may be of small diameter coiled or otherwise arranged upon the tube over the part containing the filler. It will be understood that the filler may be placed in any part of a neon sign tube where it is desired to produce the animated effect, and the application of the exterior conductive material to that part of the tube containing the filler will influence the course of the discharge and cause active shifting of the lines of light. The invention is not confined to the particular form of filler shown, although that is the preferred form. The invention is operative with any form of filler which affords a plurality of passageways for the electrical discharge.

What I claim is:

1. An electric discharge device comprising a closed glass tube containing a rare gas and spaced electrodes of solid material and a filler of insulating material between said electrodes, said filler affording a plurality of passageways for the electric discharge, and means for influencing the course of the discharge comprising electrically conductive material in contact with or closely adjacent the outer side of that portion of the tube containing the filler and not obscuring the filler, said conductive material being electrically connected to one only of said electrodes.

2. An electric discharge device comprising a closed glass tube containing a rare gas and spaced electrodes of solid material and a filler of insulating material between said electrodes, said filler affording a plurality of passageways for the electric discharge, means for influencing the course of the discharge comprising electrically conductive material in contact with or closely adjacent the outer side of that portion of the tube containing the filler and not obscuring the filler, said conductive material being electrically connected to one only of said electrodes, and a covering of transparent material enclosing said conductive material.

3. An electric discharge device comprising a closed glass tube containing a rare gas and spaced electrodes of solid material and a filler of insulating material between said electrodes, said filler affording a pluraliity of passageways for the electric discharge, and means for influencing the course of the discharge comprising a wire in contact with or closely adjacent that part of the tube containing the filler, said wire being electrically connected to one only of said electrodes.

JOHN H. McCAULEY.